May 14, 1929.   G. CORDIER   1,713,375
MACHINE FOR CUTTING FLOAT THREAD
Filed Aug. 19, 1925   4 Sheets-Sheet 1

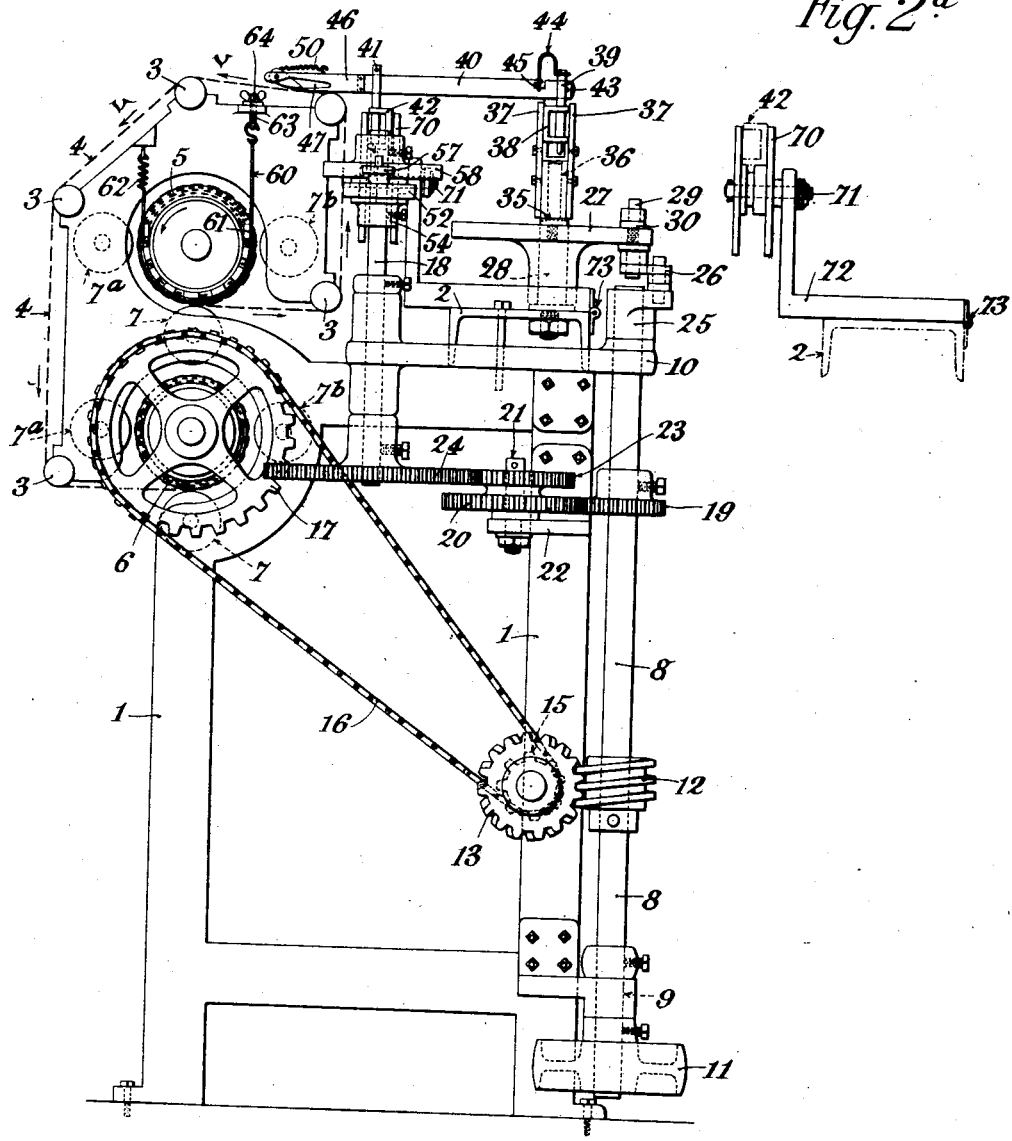

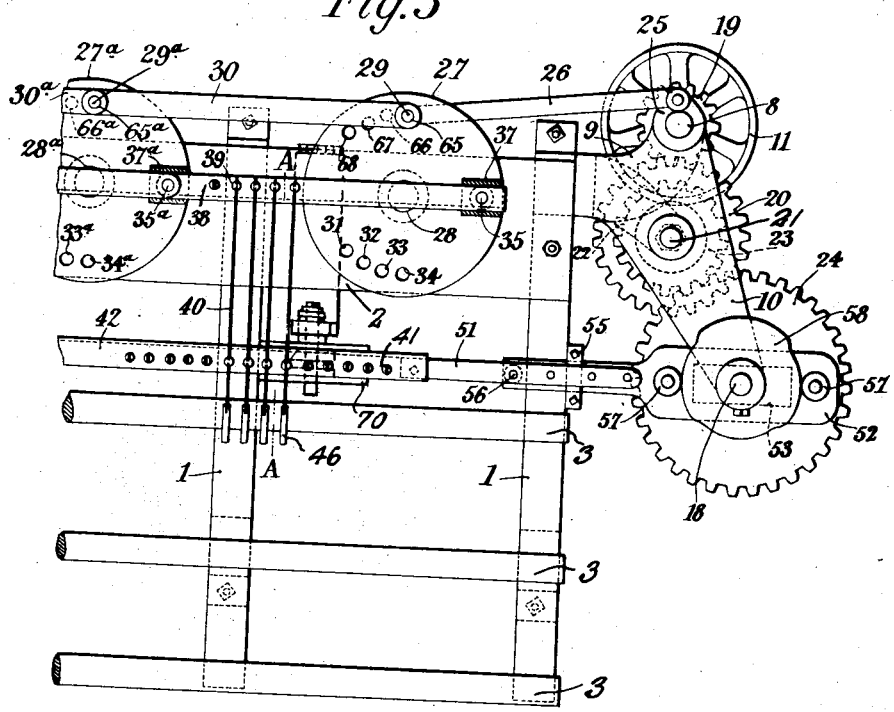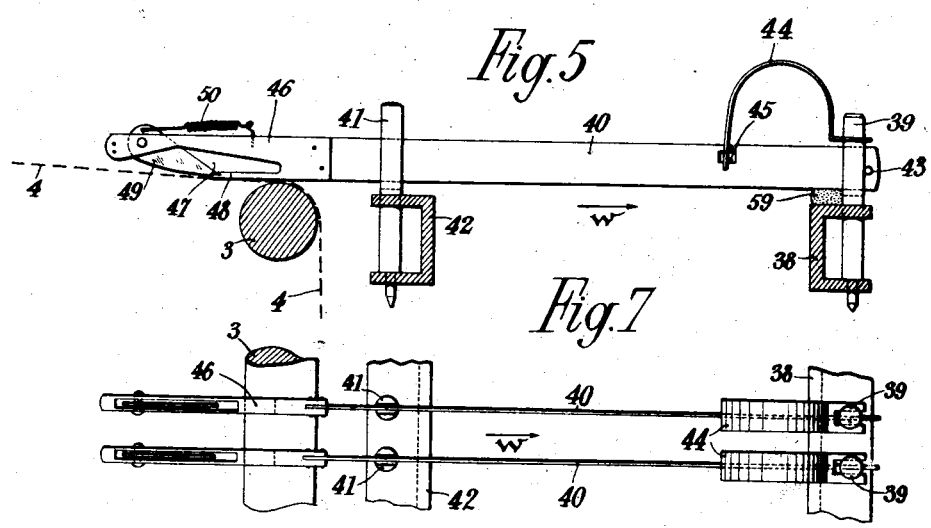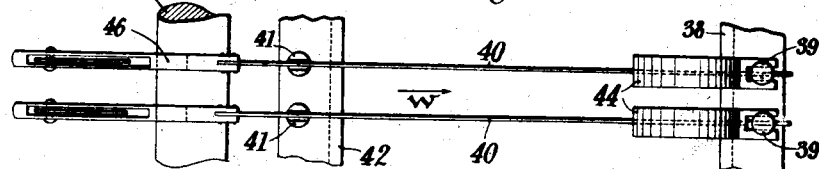

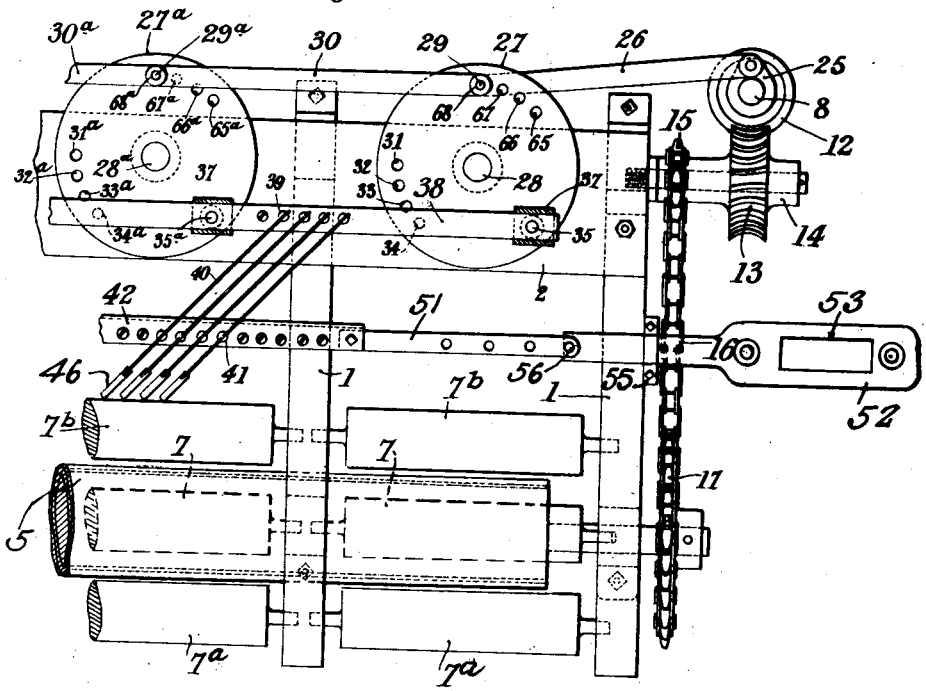

Patented May 14, 1929.

1,713,375

UNITED STATES PATENT OFFICE.

GUSTAVE CORDIER, OF CALAIS, FRANCE.

MACHINE FOR CUTTING FLOAT THREAD.

Application filed August 19, 1925, Serial No. 51,246, and in France June 30, 1925.

The present invention has for its object a machine for cutting the parallel or oblique loose threads of machine made lace or like goods which are manufactured in longitudinal bands, whether in breadths, in flounces of crosswise formation, or of all other manufacture, this cutting being performed upon the whole length and the whole width of the pieces, without being obliged to subdivide the latter into a certain number of lengthwise or transverse portions.

The said machine is arranged in the following manner:

1. None of the loose threads, whatever may be their length and inclination, can escape the action of the cutting tools.

2. The goods cannot be damaged when the cutting tools enter the holes or the very large meshes which such goods sometimes comprise, or when the said tools abut against a pattern in relief or against the attaching point of the loose yarn.

To this effect the goods are displaced in the machine in the transverse direction with respect to the direction of its manufacture, and the cutting tools which rest loosely upon the stretched surface of the goods have normally a reciprocating motion, also transversal with respect to the direction of manufacture of the goods so as to meet the loose yarn whose general direction is the same as that of the manufacture.

Each of the tools for cutting the loose yarn comprises:

(a) A support, preferably flexible, which receives the reciprocating motion with the interposition of a spring whereby the tool is not allowed to move forward, when it meets with a resistance and hence prevents it from tearing the goods.

(b) A head resting loosely upon the goods by means of a base or shoe and comprising a notch which opens towards the front part of the head and is closed by a sharp cutting blade.

The said blade is pivoted to the head and it rests normally upon the said shoe under the action of its own weight or of a spring; its edge is turned towards the interior of the notch whilst its opposite face is curved. The said cutting tools move normally in a direction parallel with that of the movement of the goods but according to requirements one may give them on either side of their normal position a variable inclination which may attain 45 degrees.

In combination with this feasibility of inclining the tools, I employ an arrangement which varies the line of motion of the shoes upon the goods during each forward movement, by imparting at this time to their heads a lateral displacement whose amplitude, adjustable at will, may be equal to onehalf, one-third, one-fourth, etc., of the distance between two consecutive tools.

In order that the loose yarn shall be slightly raised above the surface of the goods, so that the yarn shall be more readily seized by the shoes of the said tools, I provide a braking of the loose roller upon which the goods are originally wound and from which they are then unwound upon an actuated roller, after the loose yarn has been cut.

The appended drawing shows by way of example an embodiment of the invention.

Fig. 2 is a side elevation.

Figure 1:
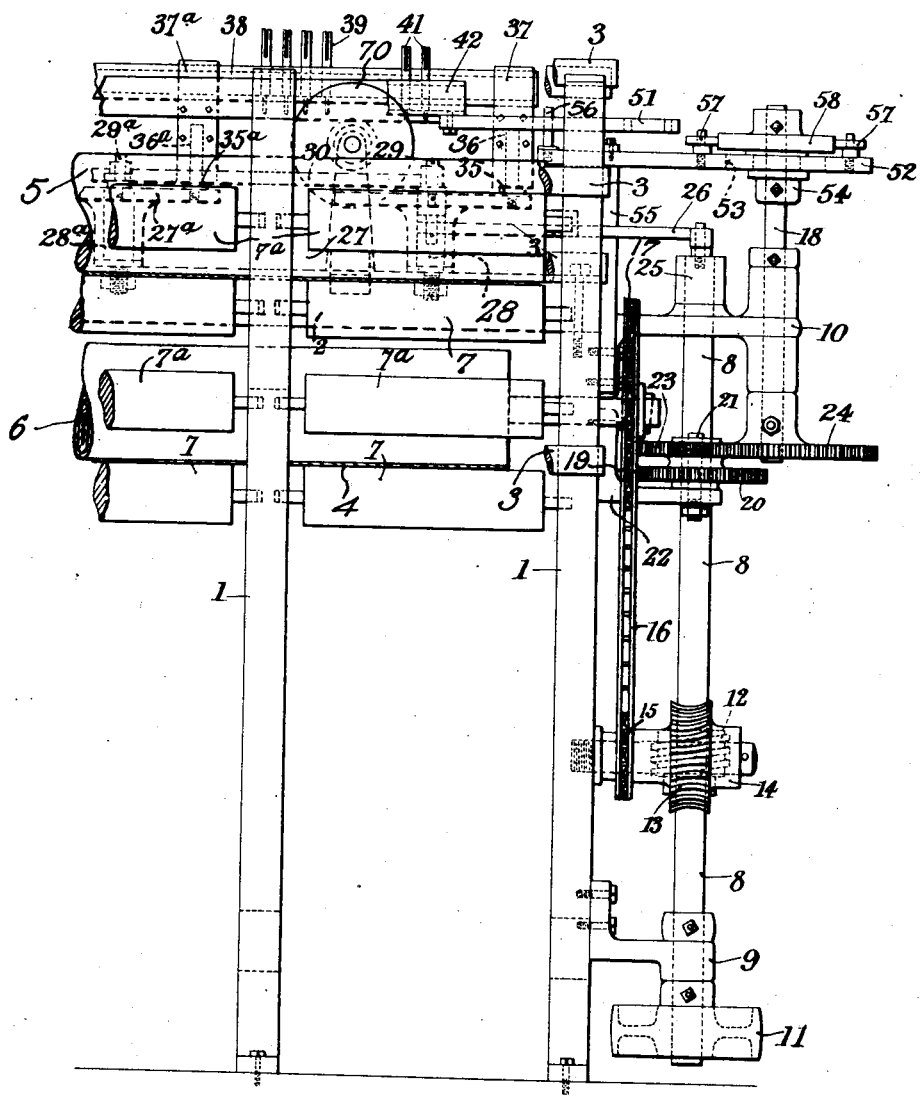
Fig. 1 is a partial front elevation of the machine.

Fig. 2ª is a side elevation of a detail showing a roller and its support.

Fig. 3 is a plan view, with certain parts removed.

Fig. 4 is also a plan view with other parts removed and the tools in a different position from the preceding.

Fig. 5 is a partial transverse section, on a larger scale, of the machine on the line A—A of Fig. 3.

Figs. 6 and 7 are respectively a partial side elevation and plan, corresponding to Fig. 5.

The main frame of the machine consists of a plurality of parallel supports 1 which are suitably spaced apart and are connected together by a cross-piece 2 having for example a U-section, said supports are further connected by the round bars 3 which are secured thereto and extend throughout the whole length of the machine so as to serve as a guide for the goods to be treated, shown at 4, whereof the wrong side slides upon the said bars.

The piece of goods to be treated is wound in the lengthwise direction on a roller 5 to which it is attached by a selvedge, whilst the other selvedge is attached to another roller 6; the direction of movement of the goods on the machine is shown by the arrows v.

The rollers 5 and 6 have a considerable length corresponding to that of the pieces of goods to be treated, and it may attain twenty-five meters; the roller 5 is loose whilst the roller 6 is controlled by a mechanism to be further described. To obviate the deflection which would be necessarily assumed by the said rollers, if they were supported at the ends, they are guided upon their whole length, except in short spaces adjacent the supports 1, by the rollers 7, 7$^a$, 7$^b$ whose length is substantially equal to the spacing of the supports 1 and which are provided with axles rotatable in holes formed in the said supports, a row of the said rollers 7 is disposed from distance to distance under each roller 5 and 6 which are thus held upon the whole length, and two other rows of rollers are disposed laterally at either side (Fig. 2) of the rollers 5 and 6 with between them a distance at least equal to the diameter of the roller 5 or 6 increased by the thicknesses of the wound lace 4 to avoid jamming when the whole of the piece of lace is wound on the one or the other of the rollers 5 and 6.

The unwinding of the goods 4 from the roller 5 is braked due to the fact that at each end of the latter there is actuated a brake consisting for example of a strip of leather 60 provided with wood shoes 61 and attached at one end to a support 62 mounted on the main frame and at the other end to a screw threaded rod 63 whereof one may regulate the length to vary the tension of the brake by acting upon a wing nut 64.

The drive of the several elements of the machine takes place from a driving shaft 8 mounted in the bearings 9 and 10 which are secured to one of the end supports 1 and it is rotated by means of a pulley 11 which is connected by a belt (not shown) to a motor of any kind.

The shaft 8 carries a worm 12 engaging a worm wheel 13 which is mounted on a sleeve 14 loosely rotatable on a shaft secured to the support 1; said sleeve carries a chain wheel 15 connected by a chain 16 with a sprocket 17 mounted on the shaft of the roller 6.

The bearing 10, which is double, supports a secondary shaft 18 which is actuated by the driving shaft 8 with the interposition of reduction gearing; to this effect, a pinion 19 mounted on the shaft 8 engages the wheel 20 mounted on a shaft 21 which is supported in a bearing 22 (also secured to the support 1) and carries a second gear wheel 23 engaging a pinion 24 mounted at the end of the shaft 18.

At the upper end of the driving shaft 8 is mounted a crank pin 25 whereof the crank is connected by a rod 26 with a disk 27 which is rotatable on an axis 28 secured to the cross-piece 2.

Like disks 27$^a$, 27$^b$, etc., are mounted in like manner and are disposed throughout the whole length of the machine between the supports 1; the rod 26 is connected with the disk 27 at the lower part of an axis 29 whereof the upper part is connected by a link 30 with the axis 29$^a$ which is mounted on the following disk 27$^a$; the axis 29$^a$ is in turn connected by a link 30$^a$ with the axis of the following disk 27$^b$ (not shown), and so on.

The axes 29, 29$^a$, 29$^b$ etc. may occupy various positions on the disks 27 from the fact that the latter are pierced with two series of holes (for example 4 holes) 31, 32, 33, 34; 65, 66, 67, 68; 31$^a$, 32$^a$, 33$^a$, 34$^a$; 65$^a$, 66$^a$, 67$^a$, 68$^a$ etc. and these various holes, as will be further set forth, serve to vary the inclination of the tools. The said disks 27 further comprises on their upper face the axes 35, 35$^a$ etc. upon each of which is mounted a prismatic block 36 which is rotatable on the axis 35 and which carries upon two opposite faces the plates 37 forming a groove.

A bar 38 having a U section is engaged by easy friction between the plates 37 and it rests on the upper part of the blocks 36; the two flanges of said bar are pierced with regularly spaced holes in which are engaged the spindles 39 supporting the rear ends of the cutting tools in a vertical slot formed in said spindles.

The said tools are disposed along the whole length of the machine, each consisting of a flexible strip 40 engaged at the rear end in the above-mentioned slot and near the forward end in a spindle 41 which is also slotted and is engaged in the holes formed in the two flanges of a bar 42 of U section. Like the bar 38, the bar 42 extends along the whole length of the machine, upon which it is suitably supported for example by rollers 70.

At the rear of the strip 40 is mounted a stud 43 serving to draw forward the tool when the bar 38 and with it the spindles 39 are moved in the direction of the arrow $w$ (Figs. 5 and 7); the entraining in the contrary direction takes place through the intermediary of a very flexible curved spring strip 44, engaged at one end with the spindle 39 and at the other in an L-shaped notch 45 in the strip 40.

At the front part of the strip 40 is mounted the head 46 of the tool in which is formed a notch 47 whose outline is shown in the drawing; the lower part of the head 46 which constitutes the shoe 48 has the shape of a trough and rests loosely upon the goods to be treated, under the action of the weight of the tool; near the front end of the head 46 is pivoted a blade 49 whose outline is shown in the drawing.

The said blade, which is as sharp as a razor, has its cutting edge directed towards the interior of the notch 47, and it rests normally on the bottom of the trough of the shoe 48 by the effect of its own weight alone, or as represented, under the action of a slight coiled spring 50. A bar 59, for example of hard wood, which is secured to the bar 38 and, like the latter, extends along the whole length of the machine, provides a surface for the supporting and the sliding of the strips 40. In addition to the reciprocating motion which is imparted to them by the disks 27, the cutting tools may further, during their functioning, be subjected to a lateral displacement, due to the following device.

The end of the bar 42 which is situated on the side next the drive of the machine is connected by a bar 51, pierced with a series of holes, to a disk 52 of elongated shape, at whose middle is formed a rectangular slot for the insertion of the supporting shaft 18 which rests upon a ring 54 secured to the shaft 18; the disk 52 comprises an arm slidable in a guide 55 mounted on the support 1 and provided with a stud 56 with which may be engaged one of the holes of the bar 51, so as to vary the length of the latter for a purpose which will be further set forth.

The disk 52 also carries two rollers 57, placed symmetrically, which are acted upon by a cam 58 mounted on the upper end of the shaft 18.

The operation of the said machine is as follows:

One of the selvedges of the piece of goods is attached to the roller 5 and the other selvedge to the roller 6, the goods being supported upon its wrong side, as above stated, by the bars 3.

The driving shaft 8, rotating in a continuous manner, will impart—through the crank 25, the rod 26 and the various links 30, 30ª, 30ᵇ etc.—a movement of oscillation to the disks 27, 27ª, 27ᵇ etc. on the respective axes 28, 28ª, 28ᵇ etc. as well as to the axes 35, 35ª etc. mounted on the said disks.

The bar 38 will hence be given a reciprocating motion during which it will remain constantly parallel to the longitudinal axis of the machine. The amplitude of movement of the disks 27 being relatively small (some 20 degrees), the chord of the circular arc described by the axes 35 may be practically considered as being the actual direction of motion of the bar 38; so also due to the relatively great distance between the spindles 39 and 41 the ends of the tools will be given a movement which is substantially rectilinear.

The shoes 48 of the said tools will as above stated rest freely upon the goods 4; their length varies according to the nature of the goods, and the weight of the tools is also adapted to this nature, since they are made of a more or less light metal, or of any other suitable material.

As shown in Figs. 1 to 3, the tools are perpendicular to the longitudinal axis of the machine, and hence to the direction of manufacture of the goods. In their forward motion, the tools meet with the loose yarn below which is inserted the thin and rounded end of the shoes 48 and which pivot the cutting blade 49 by raising the latter. After their insertion, the said blade resumes its initial position and the yarn which is thus held in the notch 47 is cut by the edge of the blade when the tools move backward.

In this normal position of the tools, the latter can readily seize and cut the loose threads which are parallel to the direction of manufacture, and even the yarn whose inclination, with respect to this direction does not exceed 45 degrees, but this will not be the case when the inclination is greater.

To obviate this drawback, the tools are given the desired inclination, to the right or the left of their normal position. If for instance the axes 29 are placed in the holes 68, 68ª etc. which are situated at 45 degrees from the holes 65, 65ª etc., the axes 35 will be given an angular displacement of 45 degrees, and the direction of the chord of the circular arc which they describe will also form an angle of 45 degrees with respect to the direction of maunfacture of the goods.

If on the other hand the bar 42 is displaced in such manner that the tools shall be situated at 45 degrees from their normal position, the shoes can now seize the loose threads which are much inclined, or from 45 to 90 degrees. By giving the tools only an inclination of 30 degrees with respect to their normal position, the tools can seize and cut the loose threads whose inclination (in the same direction as that of the tools) is between 30 and 75 degrees; this result will be obtained by placing the axes 29 in the holes 67, 67ª etc., which are situated at 30 degrees from the holes 65, 65ª etc., and by displacing the bar 42 in a corresponding manner. By placing the axes 29 in the holes 66, 66ª etc. situated at 15 degrees from the holes 65, 65ª etc., there will be obtained a movement of the tools whose direction is at 15 degrees with respect to the transverse direction of manufacture of the goods.

The use of the holes 31 to 34, 31ª to 34ª etc. will produce the same effect of variation of the angle of inclination of the movement of the tools, but this movement will now be to the right instead of to the left. It is obvious that the two aforesaid sets of holes in the disks 27 might be replaced by slots which would also permit to obtain all the positions from 0 to 45 degrees to the right and left of the normal position.

The shape of the said shoes is such that as a general rule they will be unable to enter a hole or a very large mesh of the goods so that the latter will not be damaged; also the said shoe is given a length exceeding the stroke of the tool.

On the other hand, when a shoe enters a hole or a very large mesh of the goods, the latter, proceeding above the shoe, will come into contact with the lower curved part of the blade 49 and will raise it by pivoting it about, and this will prevent the point, which is thus separated from the surface of the goods, from damaging the latter.

To these means are to be added the fact that the direction of motion of the goods (arrows $v$) is the inverse of what would cause the penetration of the shoes into the holes or the very large meshes. The goods 4, moving in this direction, will thus move away from the end of the shoes instead of moving towards them; but the speed of forward motion being, by construction, less than that of the reciprocating motion of the tools, the latter may thus rejoin the loose threads and cut them. The ratio between the speed of motion of the goods 4 and the speed of the reciprocating motion of the tools is even calculated in such manner that the said tools can reach a loose thread several times, so that the cutting must necessarily take place.

The loose threads of great length that have entered the notch 47 and have not been cut by the backward movement of the tools will still be held within the said notch, and due to the forward movement of the goods, they will be automatically drawn towards the edge of the cutting blade 49 upon which they will first be caused to bear, then be stretched, and finally be cut.

Due to the elastic control of the said tools by means of the springs 44, the goods cannot be damaged when the end of the shoe abuts against a raised portion or an attaching point of one of the loose threads. In the event of a resistance, the tool will be arrested, and the strip 44 will now yield under the thrust of the bar 38 which is transmitted by the spindle 39.

In the case in which the loose threads are very short, these might pass between the tools without being seized by the latter, which case would occur, for example if when the tools were spaced at 10 mm. apart, a loose thread of 6 mm. length came exactly between two tools. But the flexibility of the strip 40 which forms the main body of the said tools will allow their shoes to be continually given a slight lateral oscillation or vibration so that the tool will not generally pass twice exactly upon the same place of the goods; the short and badly placed thread will nevertheless be attained by the tool which is on the right or the left side of this thread.

In order to prevent in a reliable manner all failures which might occur in the case in which for any reason the vibration had not produced the desired effect, I utilize the device for the lateral displacement of the forward end of the tools by means of the cam 58; the shape of the latter is such that it will impart to the disk 52, by means of the rollers 57, an alternating and intermittent lengthwise motion whose stopping points are determined according to the necessities of the goods under treatment.

To enable the shoes of the tools to more readily seize the loose yarn, a slight lifting of the latter above the surface of the goods is effected automatically by reason of the braking to which the roller 5 is subjected. In fact, the goods, subjected to a slight resistance to the unwinding, becomes stretched in the transverse direction with respect to the direction of manufacture, and shrinks in the lengthwise direction, and this causes a very slight approach between two points attached to a given loose thread, so that the thread will be raised.

Obviously, the above-mentioned forms of construction are given solely by way of example, and without departing from the principle of the invention, I may vary the constructional dispositions and replace them by any others which are substantially equivalent for the objects proposed.

What I claim is:—

1. In a machine for cutting float threads, the combination of a main frame, consisting of a plurality of supports suitably spaced apart, bars of round cross section secured to the said supports and connecting them together, said bars extending throughout the length of the machine and serving to guide the goods whose wrong side slides upon the said bars and which are so disposed that their direction of manufacture shall be parallel to the said bars, a loose unwinding roll whose length corresponds to that of the goods and to which the latter are attached by one of the selvedge ends, a positively controlled winding roller whose length also corresponds to that of the goods and to which the latter are attached by the other selvedge end, a plurality of guide rollers disposed below the said winding rollers and between the said supports, said guide rollers serving to support the said winding rollers in order to prevent them from sagging, a plurality of guide rollers disposed at either side of the said winding rollers with a certain play whereby all jamming will be obviated when the original diameter of the winding rollers is increased by the thickness of the goods wound thereon, and a plurality of cutting tools having a reciprocating motion which is perpendicular to the direction of manufacture of the goods, each of the said cutting tools comprising a flexible strip, a stud disposed at the rear end thereof and serving to move the tool forward, a very flexible curved spring blade whereof one end is engaged with the means for driving the tool and the other end is engaged in an L-shaped cut-out part of the said flexible strip and having a suitable notch formed therein, a trough-shaped shoe disposed at the lower part of the said head, said shoe resting loosely upon the goods under the action of the weight of the tool, and a cutting blade which is pivoted to the front part of the head and whereof the cutting edge is directed towards the interior of the said notch and which normally rests upon the bottom of the said shoe by means of a slight pressure.

2. In a machine for cutting float threads, the combination of a main frame, consisting of a plurality of supports suitably spaced apart, bars of round cross section secured to the said supports and connecting them together, said bars extending throughout the length of the machine and serving to guide the goods whose wrong side slides upon the said bars and which are so disposed that their direction of manufacture shall be parallel to the said bars, a loose unwinding roll whose length corresponds to that of the goods and to which the latter are attached by one of the selvedge ends, a positively controlled winding roller whose length also corresponds to that of the goods and to which the latter are attached by the other selvedge end, a plurality of guide rollers disposed below the said winding rollers and between the said supports, said guide rollers serving to support the said winding rollers in order to prevent them from sagging, a plurality of guide rollers disposed at either side of the said winding rollers with a certain play whereby all jamming will be obviated when the original diameter of the winding rollers is increased by the thickness of the goods wound thereon, and a plurality of cutting tools having a reciprocating motion which is perpendicular to the direction of manufacture of goods, each of the said cutting tools comprising a flexible strip, a stud disposed at the end of said strip and serving to move the tool forward, a very flexible curved spring blade whereof one end is engaged with the means for driving the tool and the other end is engaged in an L-shaped cut-out part of the said flexible strip, a tool head secured to the forward end of said flexible strip and carrying the cutting tools properly so called, a bar disposed according to the length of the machine, and movable, a plurality of spindles mounted upon the said bar and having vertical slots formed therein, each spindle being adapted to receive in its vertical slot the rear end of one of the said flexible blades, a second bar extending along the machine and also carrying a set of spindles in each of which is formed a slot having engaged therein the forward end of one of the said flexible blades, the second bar being given a reciprocating motion in the direction of its length, a plurality of disks each having a vertical axis in pivotal engagement with the first-mentioned bar, said disks being given an oscillating motion on the said axes, links connecting together the said disks, the latter having two sets of holes for adjusting the position of the said links according to the degree of inclination of the tools.

3. In a machine for cutting the float threads of machine-made lace, the combination of a main frame consisting of a plurality of parallel supports suitably spaced apart, means secured to this main frame for cutting the said float threads, a loose unwinding roll whose length corresponds to that of the goods and to which the latter are attached by one of the selvedges, a positively controlled winding roller whose length also corresponds to that of the goods and to which the latter are attached by the other selvedge, a plurality of guide rollers disposed below the said winding rollers and between the said supports, said guide rollers serving to support the said winding rollers and to prevent them from sagging and a plurality of guide rollers disposed at either side of the said winding rollers with a certain play.

In testimony whereof I hereunto affix my signature.

GUSTAVE CORDIER.